(12) United States Patent
Hawley

(10) Patent No.: US 7,272,025 B2
(45) Date of Patent: Sep. 18, 2007

(54) METHOD AND APPARATUS TO CONTROL EITHER A REGULATED OR AN UNREGULATED OUTPUT OF A SWITCHING POWER SUPPLY

(75) Inventor: Stephen W. Hawley, Redwood City, CA (US)

(73) Assignee: Power Integrations, Inc., San Jose, CA (US)

( * ) Notice: Subject to any disclaimer, the term of this patent is extended or adjusted under 35 U.S.C. 154(b) by 136 days.

(21) Appl. No.: 11/038,625

(22) Filed: Jan. 18, 2005

(65) Prior Publication Data

US 2006/0158909 A1 Jul. 20, 2006

(51) Int. Cl.
*H02M 1/00* (2006.01)
*H02M 3/335* (2006.01)
*G05F 1/00* (2006.01)
*H02J 7/00* (2006.01)

(52) U.S. Cl. ............... 363/49; 363/21.13; 323/284; 320/160

(58) Field of Classification Search ............... 323/284, 323/282, 901; 363/21.12, 21.13, 21.17–21.18, 363/49; 320/160
See application file for complete search history.

(56) References Cited

U.S. PATENT DOCUMENTS

| | | | | |
|---|---|---|---|---|
| 5,119,284 | A * | 6/1992 | Fisher et al. | 363/48 |
| 5,359,281 | A * | 10/1994 | Barrow et al. | 323/284 |
| 5,969,506 | A * | 10/1999 | Neal | 320/125 |
| 6,009,008 | A * | 12/1999 | Pelly | 363/125 |
| 6,326,769 | B1 * | 12/2001 | Forsberg | 320/124 |
| 6,456,511 | B1 * | 9/2002 | Wong | 363/21.13 |
| 6,480,043 | B2 * | 11/2002 | Hall et al. | 327/108 |
| 6,480,367 | B2 * | 11/2002 | Shi et al. | 361/18 |
| 6,696,821 | B2 * | 2/2004 | Haraguchi et al. | 323/222 |
| 7,081,740 | B2 * | 7/2006 | King | 323/222 |

OTHER PUBLICATIONS

"LNK500 LinkSwitch® Family, Energy Efficient, CV or CV/CC Switcher for Very Low Cost Adapters and Chargers," Power Integrations, Inc., (Mar. 2003), pp. 1-20.
"TOP242-250 TOPSwitch®-GX Family, Extended Power, Design Flexible, EcoSmart®, Integrated Off-line Switcher," Power Integrations, Inc., (Mar. 2004), pp. 1-52.

* cited by examiner

*Primary Examiner*—Karl Easthom
*Assistant Examiner*—Harry Behm
(74) *Attorney, Agent, or Firm*—Blakely Sokoloff Taylor & Zafman LLP

(57) ABSTRACT

Techniques are disclosed to control output power from a switching power supply. For example, a switching regulator according to aspects of the present invention includes a switch to be coupled to an energy transfer element of a power supply. A controller is coupled to the switch to control a switching of the switch to regulate an output voltage and an output current at an output of power supply output. A feedback circuit is coupled to the controller. The feedback circuit is coupled to receive a feedback signal from the output of the power supply. Combinations of the output voltage and the output current correspond to output regions. There is at least one regulated output region and one unregulated output region. At least one unregulated output region is a self protection auto-restart region. Within at least one unregulated output region, the switching regulator provides continuous output power at substantially the maximum output power of the switching regulator. Each output region corresponds to a magnitude and duration of the feedback signal.

9 Claims, 10 Drawing Sheets

METHOD AND APPARATUS TO CONTROL EITHER A REGULATED OR AN UNREGULATED OUTPUT OF A SWITCHING POWER SUPPLY

BACKGROUND

1. Technical Field

The present invention relates generally to electronic circuits, and more specifically, the invention relates to switching power supplies.

2. Background Information

A common application of switching power supplies is to charge batteries. The output power of a battery charger is usually controlled to provide a regulated voltage and a regulated current. The voltage is regulated between a maximum and a minimum voltage over a range of output current. The current is regulated between a maximum and a minimum current over a range of output voltage. As the battery charges, there is usually an abrupt transition from regulated output current to regulated output voltage that occurs automatically when the battery voltage reaches a threshold. That is, the locus of output voltage and output current plotted in Cartesian coordinates usually has a sharp corner at the point of transition that corresponds to the point of maximum output power. Typically, there is also a requirement to substantially reduce the output current when the voltage falls below a threshold to prevent damage from a short circuit or similar fault on the output.

The practice of designing a battery charger to have a sharp transition between regulated voltage and regulated current can result in a product that costs more than necessary to provide the desired function. It is often possible to reduce the cost of the battery charger and to meet all requirements by designing an unregulated transition between the regulated voltage and the regulated current. The output voltage and output current in the region of unregulated transition is bounded by the natural output characteristics of the switching regulator, and typically follows the curve of maximum output power for a given output voltage or current.

To achieve lower cost, the switching regulator is designed to operate with a control circuit that permits the regulator to make an unregulated transition between regulated output voltage and regulated output current such that the voltage and current are maintained within the specified boundaries. Proper design of the unregulated transition within the specified boundaries reduces the maximum power output, allowing the use of components that are less costly than the components to guarantee higher output power. The control circuit operates the switching regulator for regulated voltage, regulated current, unregulated transition, or self-protection according to the magnitude of a feedback signal.

Battery chargers typically use one circuit to sense the output voltage and a different circuit to sense the output current for the purposes of regulation. In many applications, it is possible to eliminate the circuitry that senses output current, and to use an unregulated transition between the regulated output voltage and self-protection threshold voltage to satisfy the requirements of the design. Elimination of circuitry to sense output current reduces cost and raises efficiency.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
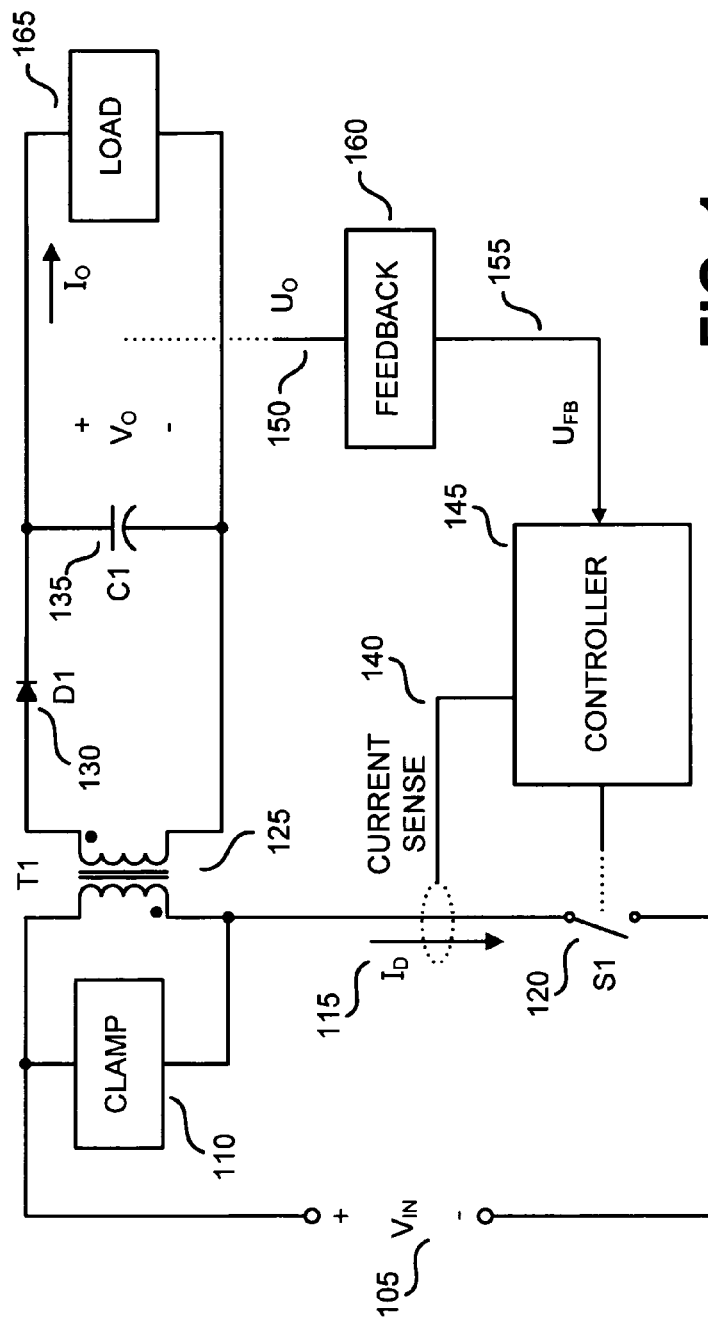
FIG. 1 is a functional block diagram of one embodiment of a switching regulator that may control output power in accordance with the teaching of the present invention.
Figure 1:
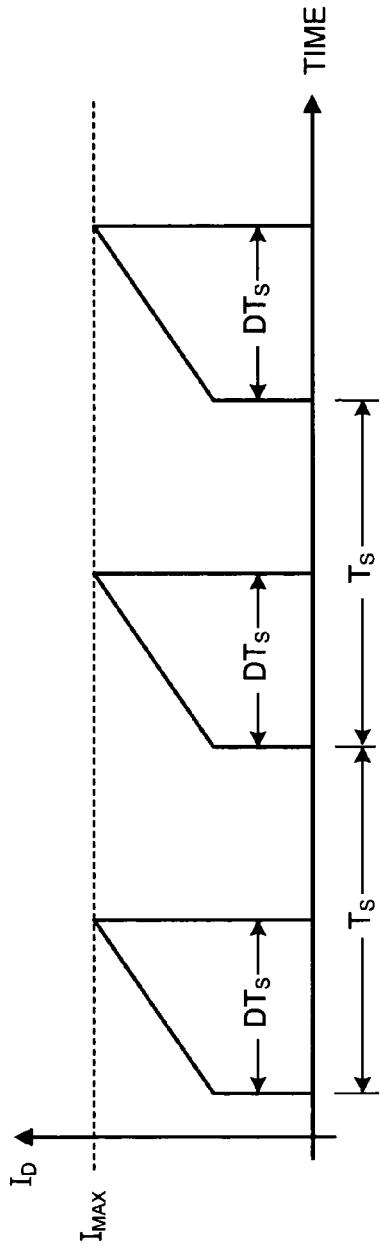

Techniques are disclosed to provide an unregulated mode of operation for a power supply that allows it to meet the requirements of a battery charger at a lower cost than conventional solutions. To illustrate, FIG. 1 shows a functional block diagram of a power supply that may include an embodiment of a power supply regulator that is a battery charger in accordance with the teachings of the present invention. The topology of the power supply illustrated in FIG. 1 is known as a flyback regulator. It is appreciated that there are many topologies and configurations of switching regulators, and that the flyback topology shown in FIG. 1 is provided to illustrate the principles of an embodiment of the present invention that may apply also to other types of topologies in accordance with the teachings of the present invention.

The power supply in FIG. 1 provides output power to a load 165 from an unregulated input voltage $V_{IN}$ 105. In one embodiment, the load 165 may be a rechargeable battery. The input voltage $V_{IN}$ 105 is coupled to an energy transfer element T1 125 and a switch S1 120. In the example of FIG. 1, the energy transfer element T1 125 is coupled between an input of the power supply and an output of the power supply. In the example of FIG. 1, the energy transfer element T1 125 is illustrated as a transformer with two windings. In general, the transformer can have more than two windings, with additional windings to provide power to additional loads, to provide bias voltages, or to sense the voltage at a load. A clamp circuit 110 is coupled to the primary winding of the energy transfer element T1 125 to control the maximum voltage on the switch S1 120. Switch S1 120 is switched on and off in response to one embodiment of a controller circuit 145 in accordance with the teachings of the present invention. In one embodiment, switch S1 120 is a transistor such as for example a power metal oxide semiconductor field effect transistor (MOSFET). In one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or output current $I_O$ at the load 165.

The output quantity to be regulated is $U_O$ 150, that in general could be an output voltage $V_O$, an output current $I_O$, or a combination of the two. The regulated quantity is not necessarily constant, but can be regulated to change in a desired way in response to a feedback signal. An output that does not respond to a feedback signal is unregulated. A feedback circuit 160 is coupled to the output quantity $U_O$ 150 to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115. FIG. 1 also illustrates an example waveform for current $I_D$ 115 to show the parameters that the controller can adjust to regulate the output quantity $U_O$ 150. The maximum of current $I_D$ 115 is $I_{MAX}$, the switching period is $T_S$, and the duty ratio is D. The controller typically limits the duty ratio to a maximum $D_{MAX}$ that is less than 100%.

In one embodiment, the controller 145 operates switch S1 120 to substantially regulate the output $U_O$ 150 to its desired value. In one embodiment, the output $U_O$ changes from an output voltage to an output current in response to the magnitude of the output voltage or the output current. In one embodiment, controller 145 includes an oscillator that defines substantially regular switching period $T_S$. In one embodiment, regulation is accomplished by control of the conduction time of the switch within a switching period. In each switching period, the fraction of the switching period that the switch is closed is the duty ratio D of the switch. In one embodiment, regulation is accomplished by control of the maximum current $I_{MAX}$ of the switch. In another embodiment, regulation is accomplished by control of the switching period $T_S$.

In one embodiment, the parameters of the regulator are substantially independent of the feedback signal $U_{FB}$ over a range of values of $U_{FB}$. When substantially independent of feedback signal $U_{FB}$, parameters $I_{MAX}$, D, and $T_S$ can be either fixed or allowed to vary in response to changes in other quantities such as for example the input voltage $V_{IN}$ 105 or the load 165. In one embodiment, such changes are determined by the natural characteristics of the topology of the power converter, such as the flyback topology. Thus, one embodiment of a regulator can be designed so that an output behaves in a desired way when it is unregulated by a feedback signal in accordance with the teachings of the present invention.

Figure 2:
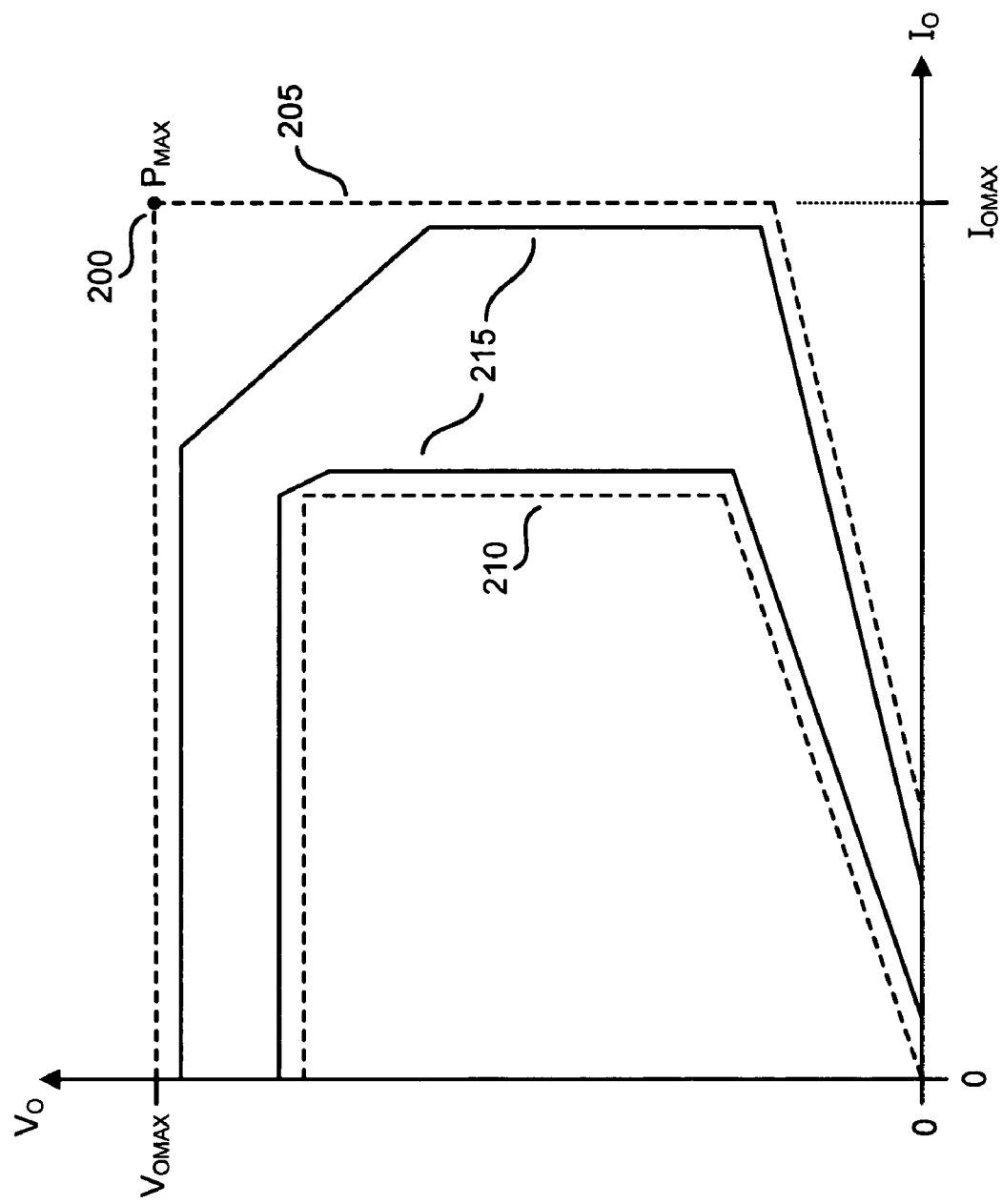
FIG. 2 is a diagram that shows the boundaries of output voltage and output current of one embodiment of a switching regulator that controls output power in accordance with the teachings of the present invention.

FIG. 2 shows boundaries for output voltage and output current of one embodiment of a switching power supply that operates in accordance with the teachings of the present invention. The output of the power supply falls within the outer boundary 205 and the inner boundary 210. The outer boundary sets a maximum output voltage $V_{OMAX}$ and a maximum output current $I_{OMAX}$ that define a maximum output power $P_{MAX}$ at the intersection 200 of the lines for $V_{OMAX}$ and $I_{OMAX}$. A power supply that has output characteristics within the region of the solid lines 215 will operate between the outer boundary 205 and the inner boundary 210 at less than the maximum output power $P_{MAX}$. Such a power supply will typically cost less than one capable of operation at $P_{MAX}$.

Figure 3:
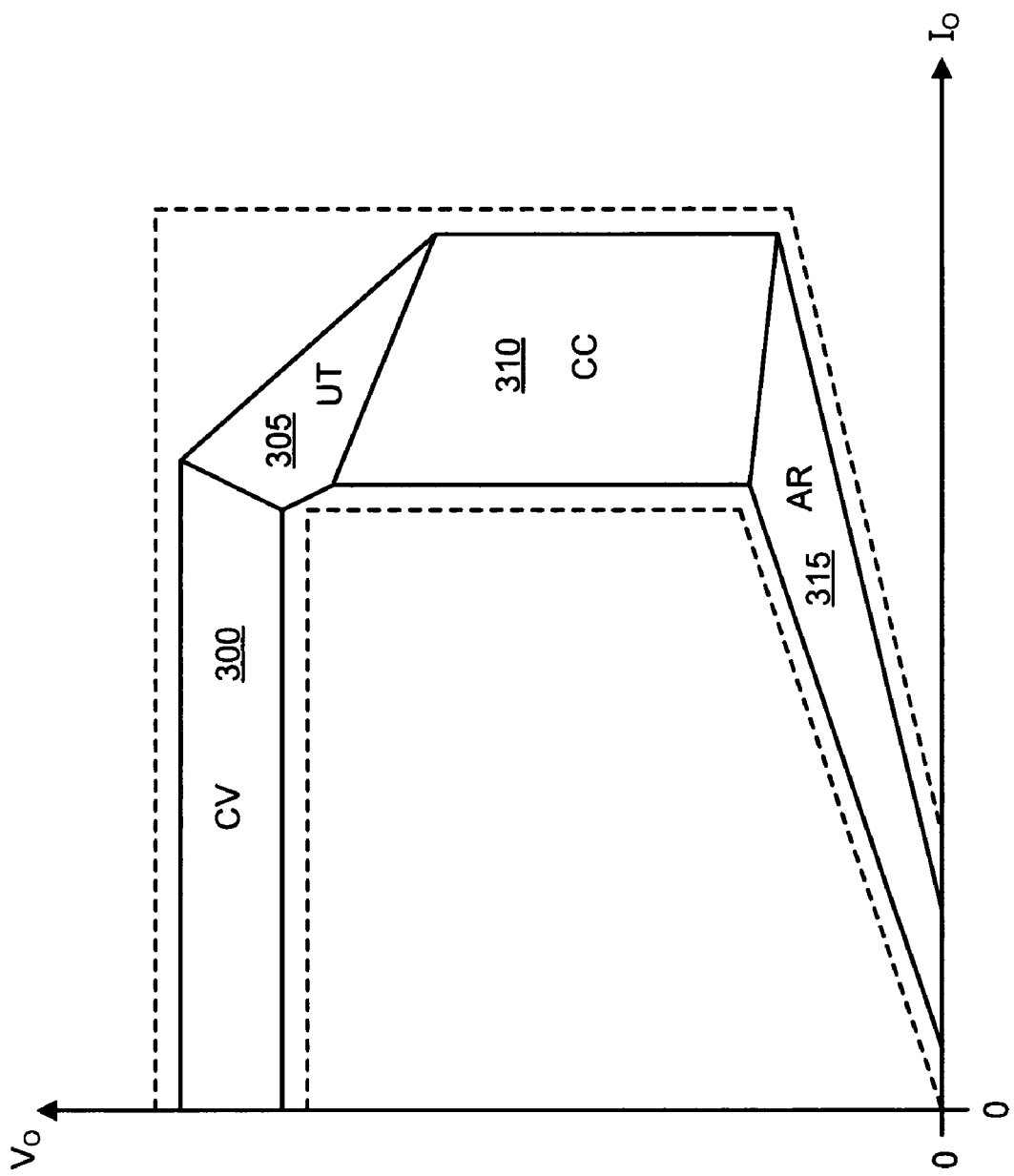
FIG. 3 shows four specific regions of operation within the boundaries of output voltage and output current for one embodiment of a switching regulator that controls output power in accordance with the teachings of the present invention.

FIG. 3 shows four specific regions within the boundaries of output voltage and output current for one embodiment of a power supply that operates in accordance with the teachings of the present invention. The CV region 300 is a region of regulated voltage where the variation in output voltage is restricted over a wide range of output current. The CC region 310 is a region of regulated current where the variation in output current is restricted over a wide range of output voltage. The UT region 305 is a transition region where the output voltage and the output current are unregulated between the CV region 300 and the CC region 310. The AR region 315 is an auto-restart region where the power supply operates at a reduced output voltage and reduced average output current to avoid damage from a short circuit fault on the output or from a fault that prevents the feedback signal from reaching the controller. In the AR auto-restart region, the power supply operates in an auto-restart cycle. In one embodiment in the auto-restart cycle, the controller allows the power switch to operate unregulated for a duration that is long enough to raise the output of the power supply above an auto-restart threshold when the load is within specifications, followed by a long interval of no switching if the output does not reach the threshold during the allowed duration of the switching. The auto-restart cycle repeats until the output of the power supply rises above the auto-restart threshold. It will be understood that not all applications will require an auto-restart region of operation. Some applications of embodiments of the present invention benefit from the UT region 315 without the AR region 315.

Figure 4:
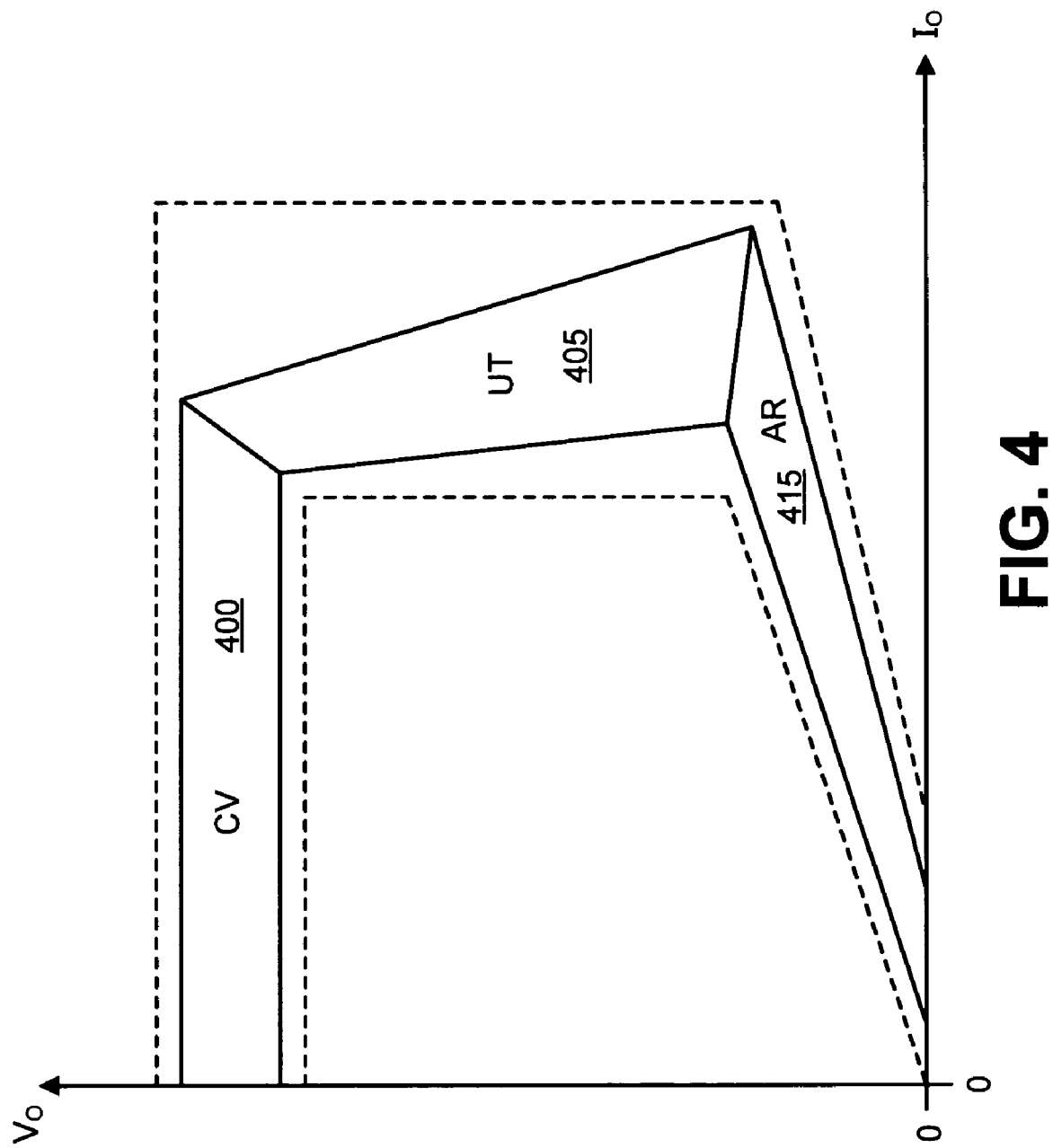
FIG. 4 illustrates three specific regions of operation within the boundaries of output voltage and output current for another embodiment of a switching regulator that controls output power in accordance with the teachings of the present invention.
Figure 5:
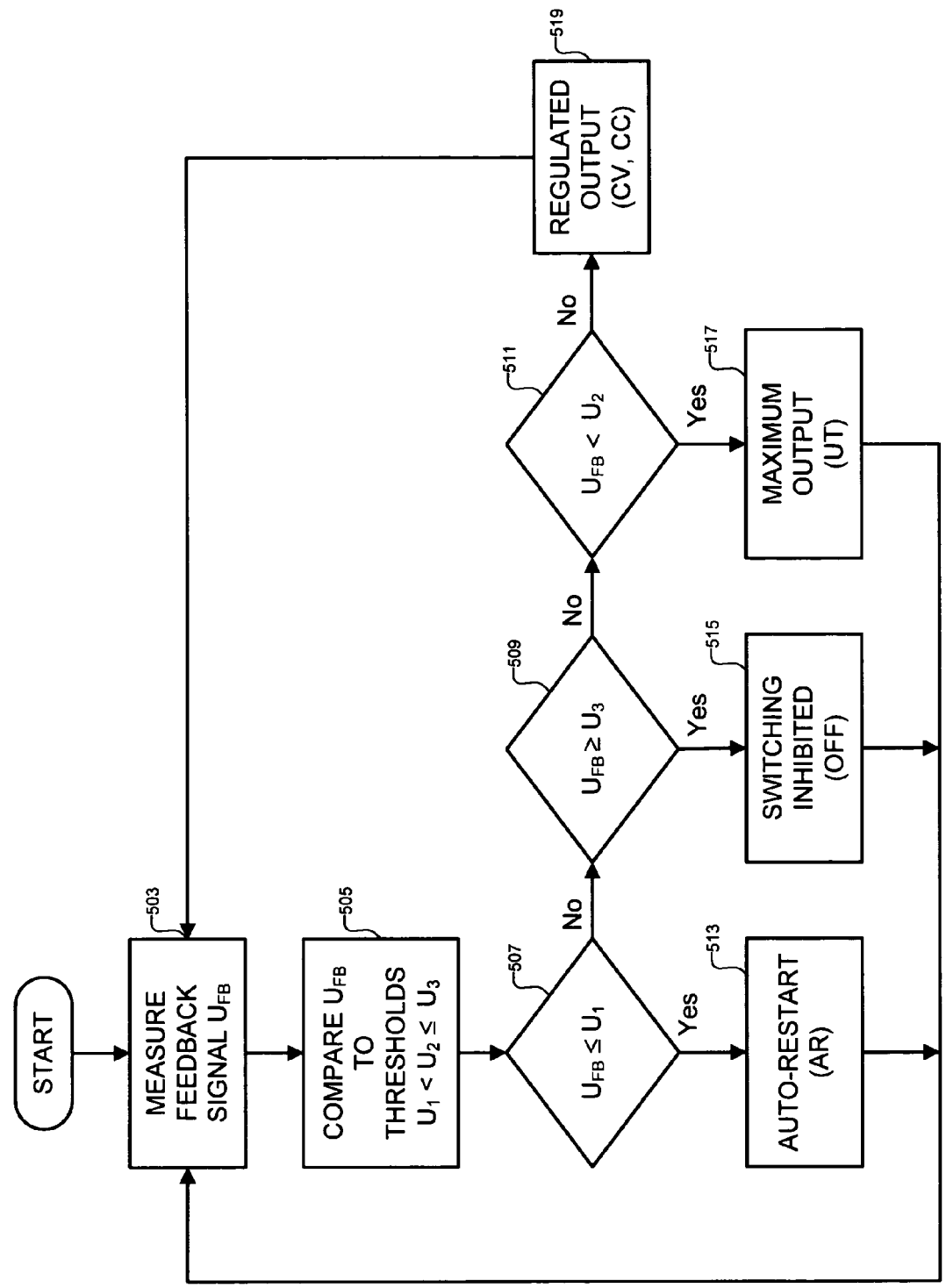
FIG. 5 is a flowchart of one embodiment of a method to control output power for an embodiment of a switching regulator in accordance with the teachings of the present invention.

Some applications of embodiments of the present invention do not require the two regions of regulated operation. FIG. 4 illustrates how one embodiment of a power supply may operate within the specified boundaries of output voltage and output current with only one regulated region, constant voltage CV region 400. An unregulated transition UT region 405 is between a regulated constant voltage CV region 400 and an auto-restart AR region 415. In applications that do not require an auto-restart AR region 415 for self-protection, requirements may be satisfied with only a constant voltage CV region 400 and an unregulated transition region UT region 405. In one embodiment, the auto-restart AR region is not required, and the UT region 405 is extended to zero output voltage without substantial reduction in output current FIG. 5 is a flowchart illustration that describes one embodiment of a method to control the output power of a switching regulator in accordance with the teachings of the present invention. As shown, a feedback signal $U_{FB}$ is measured on block 503. The magnitude of the signal is then compared to thresholds in block 505. The results of the comparisons determined in blocks 507, 509 and 511 are used to select a particular region of operation. In FIG. 5, the thresholds are $U_1$, $U_2$, and $U_3$ with $0<U_1<U_2 \leqq U_3$.

If the feedback signal is sufficiently small (less than or equal to $U_1$), the controller operates the regulator in the unregulated auto-restart AR region as indicated in block 513. If the feedback signal is larger than an upper threshold (greater than or equal to $U_3$), the controller operates the regulator in the unregulated inhibited switching mode so that the power switch is off as indicated in block 515. For either magnitudes of the feedback signal, the controller either regulates the power supply output in regulated mode, as indicated in block 519 or operates the regulator in an unregulated mode to produce a maximum unregulated power, as indicated in block 517.

In one embodiment, the change in operation between regions is not instantaneous when the feedback signal crosses a feedback threshold. In one embodiment, the value of the feedback signal satisfies a threshold condition for an established time before the controller will change the operation to a different region in accordance with the teachings of the present invention.

The power supply responds to the magnitude of the feedback signal $U_{FB}$ to operate in one of the output regions. In one embodiment, the magnitude of the feedback signal $U_{FB}$ determines the operation of the power supply according to the relationship illustrated in FIG. 6.

Figure 6:
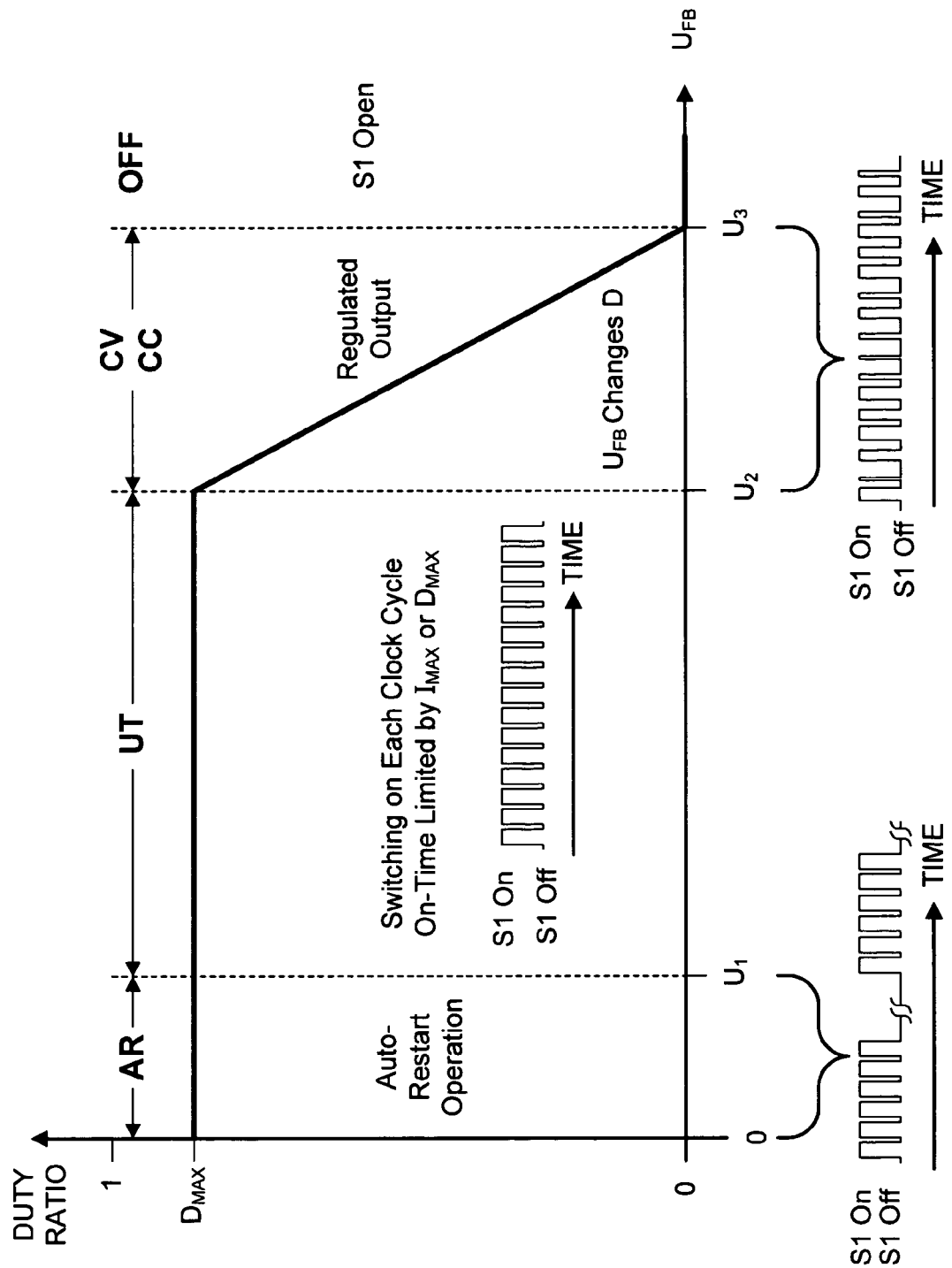
FIG. 6 describes the control characteristics of one embodiment of a switching regulator that uses pulse width modulation to regulate an output in accordance with the teachings of the present invention.

FIG. 6 shows an embodiment of the control characteristics of one embodiment of the method described in FIG. 5 in a pulse width modulated controller where the duty ratio changes in response to the feedback signal. In one embodiment, a constant frequency clock defines cycles in which the power switch may conduct. As shown in the embodiment of FIG. 6, the duty ratio D varies linearly with the magnitude of the feedback in the region of regulated output, going between zero and the maximum $D_{MAX}$ when the feedback signal $U_{FB}$ is between $U_2$ and $U_3$ in accordance with the teachings of the present invention.

In one embodiment, the regulator operates in the unregulated transition UT region when the feedback signal $U_{FB}$ is between $U_1$ and $U_2$. It operates in the auto-restart AR region when the feedback signal $U_{FB}$ is less than $U_1$. In the unregulated transition region, the controller limits the on-time of the power switch only by a maximum duty ratio $D_{MAX}$ or by a maximum current $I_{MAX}$ of the power switch, substantially independent of the magnitude of the feedback signal. Ordinary pulse width modulated controllers with an auto-restart region typically have an unregulated transition UT region that is a negligibly small artifact of the design, the goal being to avoid unregulated operation. Embodiments of the present invention expand the unregulated transition region of the controller to realize a benefit in the control of output power of a switching regulator in accordance with the teachings of the present invention.

Figure 7:
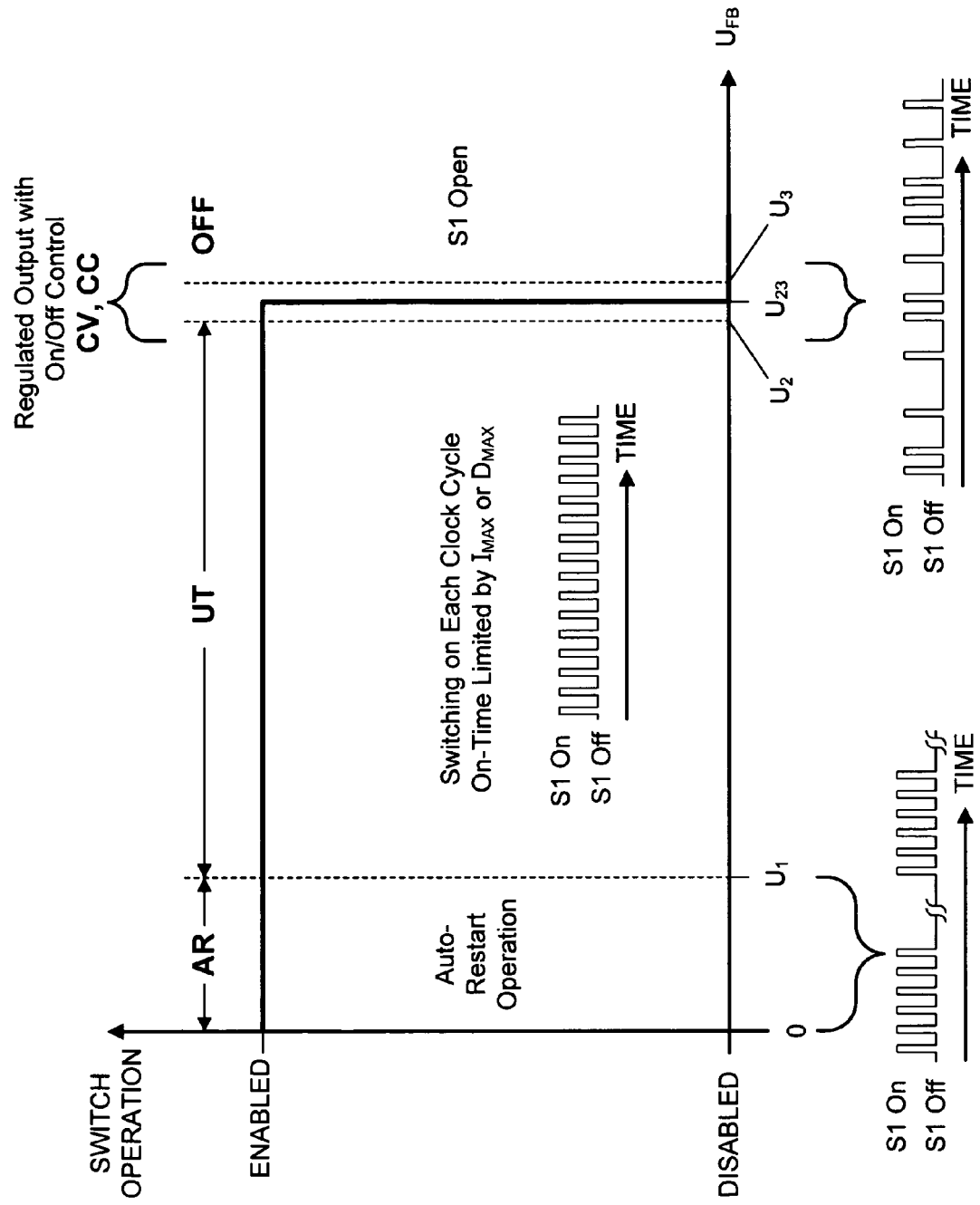
FIG. 7 describes the control characteristics of one embodiment of a switching regulator that uses an on/off control to regulate an output in accordance with the teachings of the present invention.

FIG. 7 shows the control characteristics of another embodiment of the method described in the flowchart of FIG. 5. In contrast to the pulse width modulated controller of FIG. 6 that uses the feedback signal to change the duty ratio of the power of the power switch, the on/off controller embodiment described in FIG. 7 uses the feedback signal simply to enable or disable the operation of the power switch. The region of regulated output is restricted to a narrow range determined by the thresholds $U_2$ and $U_3$. In the simplest limiting case, $U_2$ and $U_3$ merge to a single value $U_{23}$. Regulation is accomplished by variation of the feedback above and below the threshold $U_{23}$ to inhibit or enable the power switch to conduct during a clock cycle. When the magnitude of the feedback signal $U_{FB}$ is below the region for regulated output, the controller operates in either the unregulated transition UT region or the auto-restart AR region in the same way as the pulse width modulated controller illustrated in FIG. 6.

Figure 8:
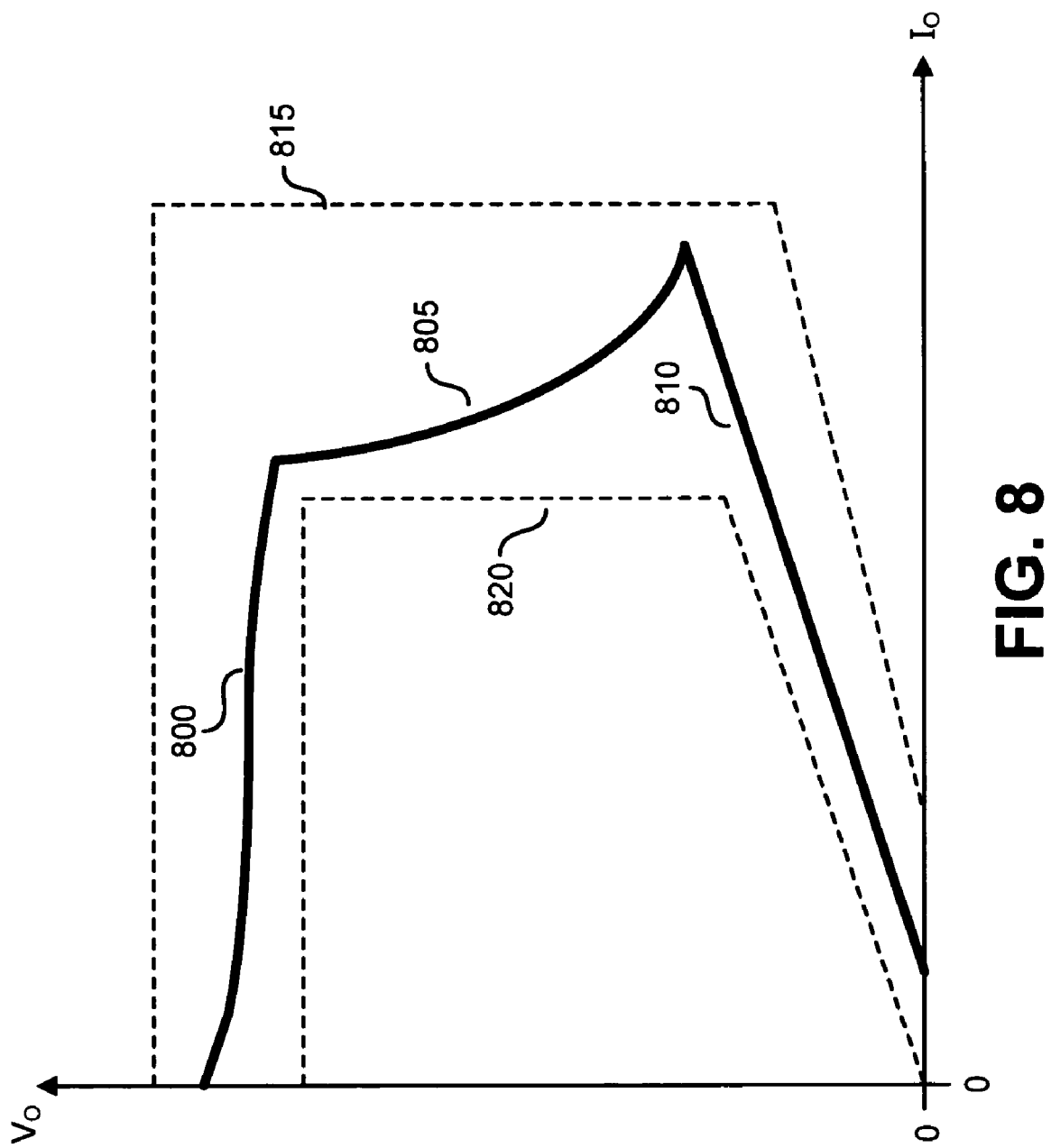
FIG. 8 shows the output voltage and current characteristics of a typical switching regulator battery charger controlled in accordance with the teachings of the present invention.

FIG. 8 shows the characteristics of the output voltage and current of one embodiment of a switching power supply that operates in accordance with the teaching of the present invention. Line segment 800 of the output characteristic is the locus of output voltage and output current in the constant voltage CV region. Line segment 805 is the locus of output voltage and output current in the unregulated transition UT region. Line segment 810 is the locus of output voltage and output current in the auto-restart AR region. As shown, the output voltage and output current fall within the specified boundaries 815 and 820.

Figure 9A:
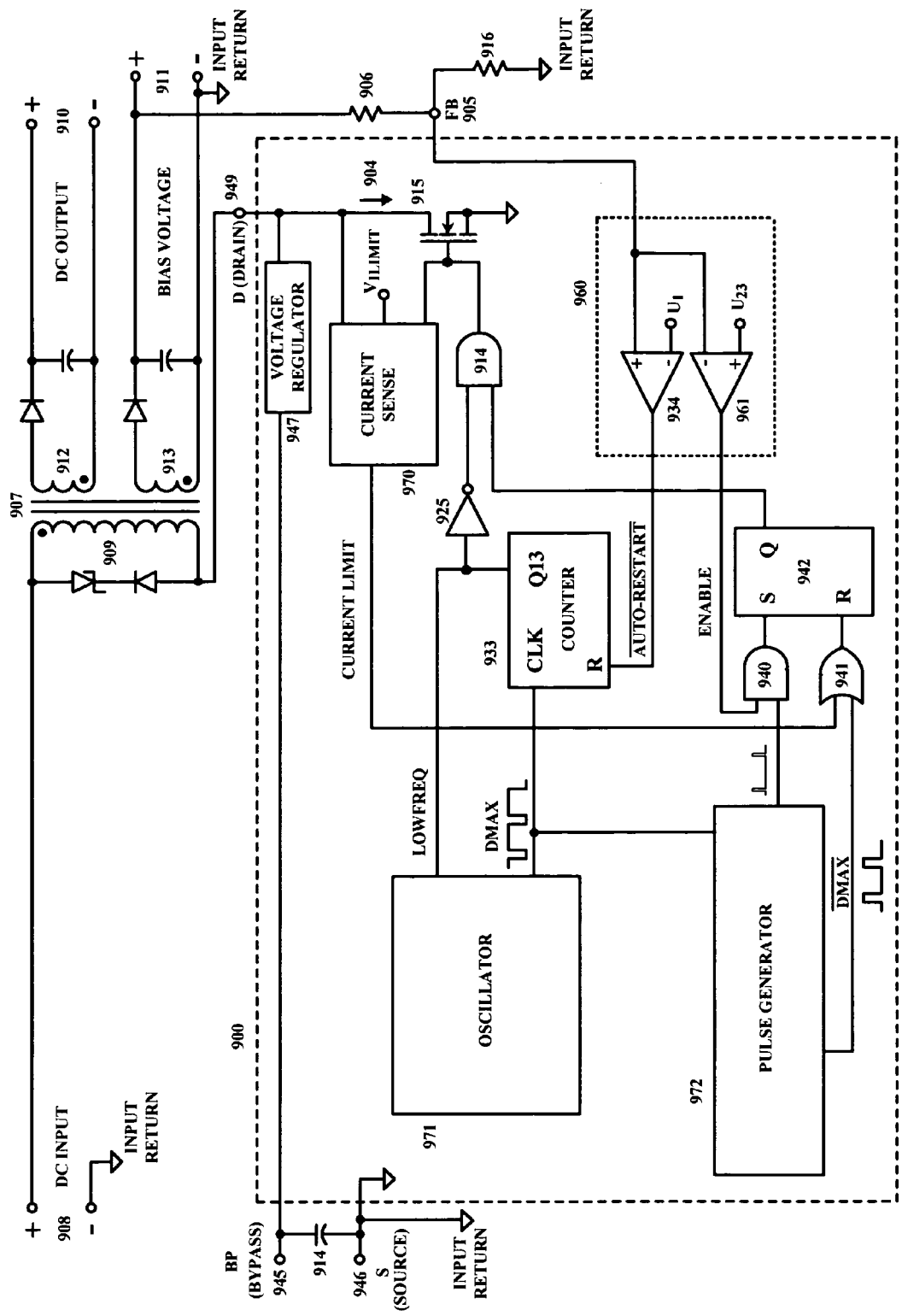
FIG. 9A is one embodiment of a circuit diagram of power supply with an integrated circuit controller in accordance with the teachings of the present invention.
Figure 9B:
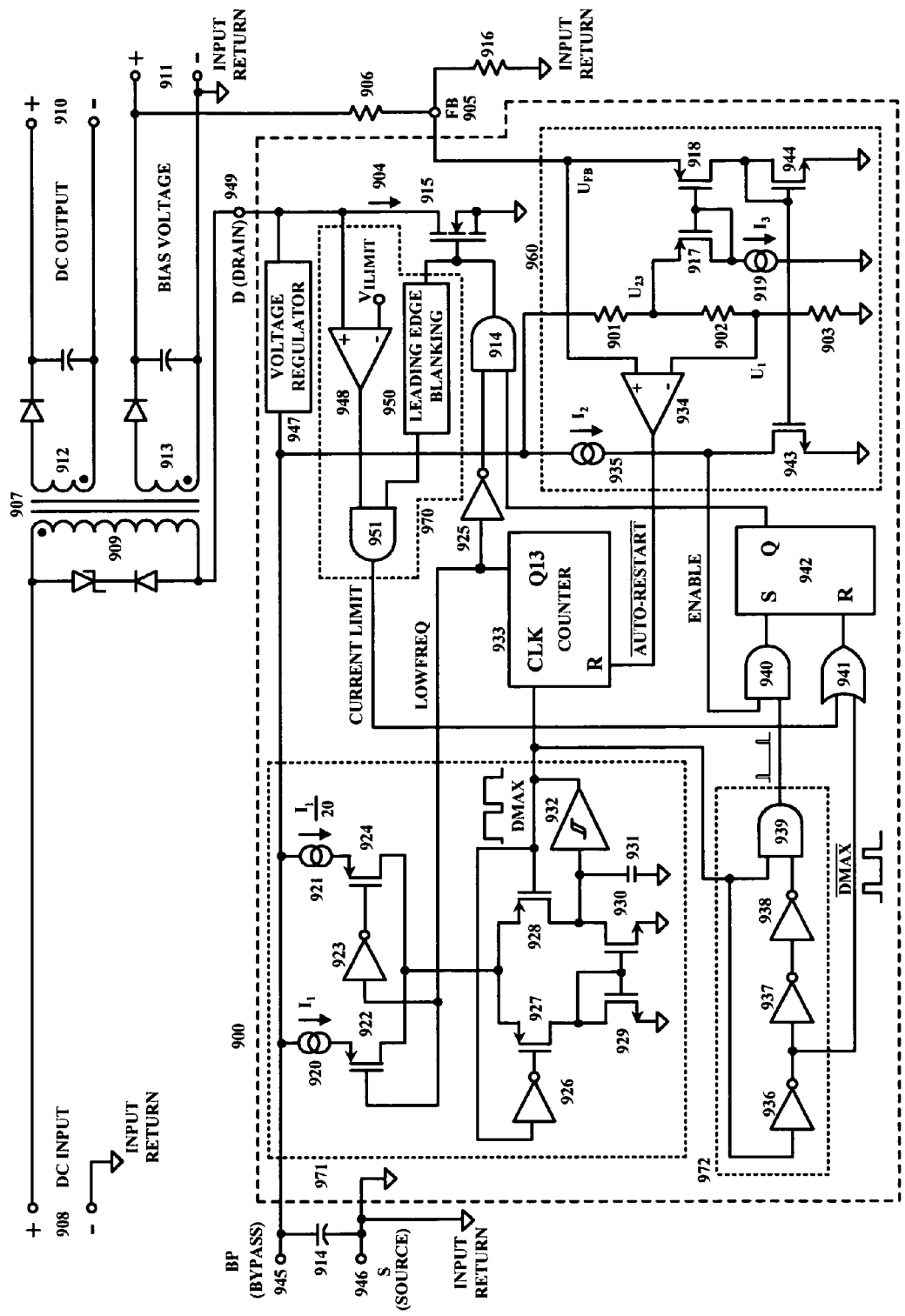
FIG. 9B is another embodiment of a circuit diagram of power supply with an integrated circuit controller in accordance with the teachings of the present invention.

In one embodiment, a power switch, a current sensing circuit, and a controller are combined into an integrated circuit to control the output power of a switching regulator. To illustrate, FIGS. 9A and 9B show schematics of embodiments of the present invention in a power supply that uses an integrated circuit 900 to realize the on/off control characteristic illustrated in FIG. 7. As shown, FIG. 9B shows example embodiments of some of the elements in FIG. 9A in greater detail and the following discussion applies to both FIGS. 9A and 9B. An energy transfer element 907 receives a DC voltage input 908 on a primary winding 909 to provide a DC output voltage 910 from a secondary winding 912 and a bias output voltage 911 from a secondary winding 913. Bias output voltage 911 is coupled to output voltage 910 through the transformer action of energy transfer element 907 such that bias output voltage 911 is a measure of output voltage 910. Thus, output voltage 910 is regulated indirectly by regulation of bias voltage 911.

Integrated circuit 900 is coupled to the primary winding 909 of energy transfer element 907 at a drain terminal 949. The integrated circuit 900 includes a MOSFET power switch 915 and a voltage regulator circuit 947 that are coupled to a drain terminal 949. Voltage regulator 947 provides a regulated voltage at a bypass terminal 945 that is coupled to a bypass capacitor 914. The regulated voltage at the bypass terminal 945 is a power supply for the internal circuits of integrated circuit 900.

A feedback terminal 905 is coupled to resistors 906 and 916 to receive a feedback voltage that is proportional to bias voltage 911. A source terminal 946 is coupled to the source of the MOSFET 915.

An oscillator 971 produces a clock signal that defines the switching cycles. The output from oscillator 971 is logic high during the time in each cycle that corresponds to the maximum duty ratio of the power switch. Oscillator 971 receives a signal that reduces the frequency of the oscillator when the controller operates in the auto-restart region. FIG. 9B shows in detail one embodiment of oscillator 971.

Current sources 920 and 921, transistors 922 and 924, and inverter 923 provide either high or low current to charge timing capacitor 931 according to the frequency selection input LOWFREQ. Inverter 926, transistors 927, 928, 929, 930, and non-inverting buffer with hysteresis 932 complete the oscillator circuit. In one embodiment, the frequency of the oscillator is reduced by a factor of 20 when the frequency selection input LOWFREQ is logic high.

A pulse generator circuit including inverters 936, 937, 938 and NAND gate 939 provides signals to determine the on-time of the power switch. The output of AND gate 939 is a narrow positive pulse at the beginning of each oscillator clock cycle.

The feedback voltage at the feedback terminal 905 is received by measurement circuit 960 that compares the magnitude of the feedback signal to thresholds $U_1$ and $U_{23}$ with comparators 934 and 961 respectively. As long as the feedback signal is greater than $U_1$, the output of comparator 934 will be logic high to keep the output of auto-restart counter 933 low, disabling auto-restart operation. When the regulator operates in the auto-restart region, the output of counter 933 allows a fixed number of drive pulses from flip-flop 942 to reach the gate of MOSFET 915, followed by a substantially longer interval without drive pulses. In one embodiment, the interval without drive pulses is 20 times the interval with drive pulses. A logic high output of counter 933 reduces the frequency of oscillator 971 while providing a logic low output from inverter 925, to one input of AND gate 914, blocking the drive signal from the output of flip-flop 942.

When the feedback signal $U_{FB}$ is greater than $U_{23}$, comparator 961 applies a logic low signal to an input of AND gate 940 that prevents pulses from pulse generator 972 from setting flip-flop 942, inhibiting the drive signal to the gate of MOSFET 915. Thus switching is inhibited. When feedback $U_{FB}$ falls below threshold $U_{23}$, a logic high output of comparator 961 allows the output of flip-flop 942 to drive the gate of MOSFET 915. MOSFET 915 turns off when flip-flop 942 is reset by either the maximum duty ratio input or the current limit input to OR gate 941. Either event resets the output of flip-flop 942 to remove the drive from the gate of MOSFET 915.

Comparator 961 includes transistors 917, 918, 943, 944, with current sources 934 and 919. Resistors 901, 902 and 903 together with current source 919 set the thresholds $U_1$ and $U_{23}$.

Current sense circuitry 970 includes comparator 948 that measures the voltage on the drain of MOSFET 914 when it conducts drain current 904. The voltage on the drain is substantially proportional to the current 904 by the on-resistance of the MOSFET. The output of current limit comparator 948 is logic high when the on-voltage of the drain exceeds $V_{ILIMIT}$. A logic high at the output of AND gate 951 will reset the flip-flop 942 to remove the drive to MOSFET 915. A leading edge blanking circuit 950 with AND gate 951 masks the output of the current limit comparator 948 for a short duration after MOSFET 970 turns on to avoid premature termination of the on-time from initial high current from the discharge of parasitic capacitance.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A switching regulator, comprising:
   a switch to be coupled to an energy transfer element of a power supply;
   a controller coupled to the switch to control a switching of the switch to control an output of the power supply, wherein the output of the power supply includes a combination of an output voltage and an output current; and
   a feedback circuit coupled to the controller, the feedback circuit coupled to receive a feedback-signal derived from the output of the power supply, wherein combinations of the output voltage and the output current correspond to either regulated or unregulated output regions in which the power supply can operate, wherein at least one unregulated output region is a self protection auto-restart region where the power supply operates at a reduced output voltage and reduced average output current and where the controller continuously cycles between a first period of unregulated switching of the switch and a second period of no switching of the switch while in the auto-restart region, wherein within another unregulated output region the switching regulator provides continuous output power at substantially the maximum output power of the switching regulator, and wherein a magnitude of the feedback signal corresponds to one of the regulated or unregulated output regions in which the power supply can operate.

2. The switching regulator of claim 1 wherein the switching regulator is included in a battery charger.

3. The switching regulator of claim 1 wherein the controller includes an integrated circuit.

4. The switching regulator of claim 1 wherein the controller includes discrete electrical components.

5. A method, comprising:
   measuring a feedback signal derived from an output of a power supply;
   operating the power supply in an unregulated self protection auto-restart mode where the power supply operates at a reduced output voltage and reduced average output current if the feedback signal is less than a first threshold, wherein operating the power supply in an unregulated self protection auto-restart mode comprises continuously cycling between a first period of unregulated switching of the power supply and a second period of no switching of the power supply;
   operating the power supply in an unregulated maximum power mode if the feedback signal is between the first threshold and a second threshold; and
   operating the power supply in a regulated mode if the feedback signal is between the first threshold and a third threshold while greater than the second threshold.

6. The method of claim 5 further comprising operating the power supply in an unregulated inhibited switching mode if the feedback signal is greater than the third threshold.

7. The method of claim 5 wherein the first threshold is less than the third threshold.

8. The method of claim 7 wherein the second threshold is less than or equal to the third threshold.

9. The method of claim 6 wherein the output of the power supply is not regulated in response to the feedback signal when the power supply is operating in any one of the unregulated self protection auto-restart mode, the unregulated inhibited switching mode or the unregulated maximum power mode.

* * * * *